Patented Sept. 30, 1924.

1,510,067

UNITED STATES PATENT OFFICE.

ERIK J. NORBERG, OF EVERETT, WASHINGTON.

RUST-DISSOLVING LIQUID.

No Drawing.     Application filed February 26, 1923.   Serial No. 621,473.

*To all whom it may concern:*

Be it known that I, ERIK J. NORBERG, a citizen of the United States, residing at Everett, Snohomish County, Washington, have invented a new and useful Rust-Dissolving Liquid, of which the following is a specification.

The object of my invention is the production of a fluid composition for dissolving and removing rust in either accessible or comparatively unaccessible places such as in threaded or other joints, whereby the latter may be separated or screwed apart without breaking or doing violence to the structure, without the aid of powerful tools and with a minimum of physical exertion on the part of the mechanic or operator.

My composition consists in its larger portion of an acid liquid obtained from a fermented or alcoholic liquid by oxidization, such as vinegar; a minor portion of an acid such as carbolic acid, and a similar portion of a pungent, mobile liquid obtained by the destructive distillation of wood by the oxidization of alcohol with ferments, such as acetic acid.

In preparing the composition I prefer to use the ingredients in about the following proportions—viz, White vinegar, eight parts,
Carbolic acid, one part,
Acetic acid, one part.

A few drops of odor neutralizer, or perfume extract are also added to each eight ounces of the above compound. Rosewater has been found suitable for impregnating the compound with a more agreeable odor. The whole compound is thoroughly mixed, or stirred together, as by the egg-beater process.

My composition is highly fluid and penetrative as well as active in its dissolution of rust which it attacks in out of the way positions by a sort of capillary attraction.

I claim:

1. A composition adapted to penetrate and dissolve rust, comprising in its larger proportion an acid liquid, a smaller proportion of crystalline burning acid such as carbolic acid, and a pungent and mobile liquid obtained by destructive wood distillation.

2. A rust-dissolving composition which consists of a larger proportion of alcoholic liquid acid, a smaller proportion of burning acid such as carbolic acid, and a substantially similar proportion of a pungent and mobile acid obtained from destructive wood distillation.

3. A composition for removing rust which consists substantially of about eight parts of white vinegar, one part of carbolic acid, one part of acetic acid, and a few drops of a suitable flavoring extract.

In testimony whereof I have hereunto signed my name.

ERIK J. NORBERG.